United States Patent

Juen

Patent Number: 5,818,524
Date of Patent: Oct. 6, 1998

[54] DIGITAL STILL CAMERA HAVING AN IMAGE DATA COMPRESSION FUNCTION

[75] Inventor: Masahiro Juen, Yokohama, Japan

[73] Assignee: Nikon Corporation, Tokyo, Japan

[21] Appl. No.: 617,957

[22] Filed: Mar. 11, 1996

Related U.S. Application Data

[63] Continuation of Ser. No. 131,739, Oct. 5, 1993, abandoned.

[30] Foreign Application Priority Data

Oct. 6, 1992 [JP] Japan .................................... 4-267585

[51] Int. Cl.⁶ ............................... H04N 5/76; G06K 9/68
[52] U.S. Cl. ......................... 348/231; 348/419; 348/420; 382/232; 382/244
[58] Field of Search .................................. 382/232, 244; 348/419, 420, 410, 421, 397, 231, 207; 358/335, 906, 909.1, 404, 426, 444

[56] References Cited

U.S. PATENT DOCUMENTS

| | | | |
|---|---|---|---|
| 4,517,596 | 5/1985 | Suzuki | 358/133 |
| 4,982,291 | 1/1991 | Kurahashi et al. | 358/335 |
| 5,016,107 | 5/1991 | Sasoon et al. | 358/209 |
| 5,081,450 | 1/1992 | Lucas et al. | 382/232 |
| 5,093,731 | 3/1992 | Wanatabe et al. | 358/335 |
| 5,212,742 | 5/1993 | Normile et al. | 382/56 |
| 5,249,053 | 9/1993 | Jain | 358/209 |
| 5,267,333 | 11/1993 | Aono et al. | 382/56 |
| 5,287,420 | 2/1994 | Barrett . | |
| 5,432,871 | 7/1995 | Novik | 382/232 |

Primary Examiner—Leo Boudreau
Assistant Examiner—Bipin Shalwala

[57] ABSTRACT

A video still camera in which an image of a photographic subject is converted to digital image data and the digital image data is compressed and stored in memory. The digital image data is first reversibly compressed by a high speed reversible encoder and temporarily stored in a buffer memory. The compressed data is then read from the buffer memory and restored by a reversible code regenerator, after which the restored data is irreversibly compressed and stored on a memory card. By compressing the stored image data before placing it in the buffer memory, the number of frames of image data possible for storage is increased. Furthermore, the capacity of the buffer memory may be decreased while maintaining transmission speed. The still camera may also include a code character memory which stores a code character representing the quantity of data encoded by the reversible encoder, and a parameter setting unit which sets parameters for controlling the irreversible data compression. The parameters set by the parameter setting unit are based upon the data quantity stored in the code character memory.

15 Claims, 4 Drawing Sheets

DIGITAL STILL CAMERA HAVING AN IMAGE DATA COMPRESSION FUNCTION

This application is a continuation of application Ser. No. 08/131,739, filed Oct. 5, 1993, now abandoned.

BACKGROUND OF THE INVENTION

1. Field of the Invention

The present invention relates to a video still camera in which an image of a photographic subject is converted to digital image data and the digital data is compressed and recorded in memory.

2. Description of the Related Art

Still cameras are known which record an image of a photographic subject as a digital image in memory. For example, FIG. 1 is a block diagram of a prior art imaging system for a still camera which records the image of a photographic subject as a digital image data in memory. An imaging unit 10 photoelectrically converts light from a photographic field by means of a built-in CCD, or similar device, and after white balance correction, amplification, γ correction and the like processing have been performed, the imaging unit 10 performs analog to digital (A/D) conversion and outputs the image as digital image data. A buffer memory 12 temporarily stores the digital image data from the imaging unit 10. The image data stored in the buffer memory 12 is read out in response to instructions from a control unit 18 which performs synchronous control of the whole camera. The image data read from buffer memory 12 is input to a data compression circuit 14 which performs well-known data compression processing on the image data. Finally, the image data which has been compressed is recorded in a memory on a memory card 16 via an I/O circuit (not shown).

In the prior art imaging system described above, because of the limited capacity of the memory card 16, a high efficiency irreversible encoder is utilized as the data compression circuit 14. The high efficiency irreversible encoder performs data compression by omitting information which is unnecessary for human vision. However, when the compressed signals are restored, distortion arises with respect to the original image due to the information omitted from the original data during data compression. Examples of high efficiency irreversible encoders are those based on the adaptive discrete cosine transform (ADCT), the JPEG (Joint Photographic Experts Group), the discrete cosine transform (DCT), and similar types which perform vector quantization after transform coding. A ¹/₁₀–¹/₃₀ degree of data compression can be expected from these types of encoders.

Furthermore, when a high efficiency irreversible encoder is used as the data compression circuit 14, complicated signal processing is generally necessary. In order to achieve high picture quality, it is necessary to process a large number of image elements, and because of the complicated signal processing necessary when using the high efficiency irreversible encoder, an extended time period is generally required for the data compression processing. Because of the length of time required for processing, the buffer memory 12 becomes full as a result of the delay in processing caused by the data compression circuit 14, and the processing of a succeeding photograph is temporarily delayed.

One solution to the above-noted problems is to increase the capacity of the buffer memory 12 such that a large number of images may be temporarily stored at the same time. However, during normal still camera photography, it is unusual to photograph a large number of images in rapid succession and, therefore, a large buffer memory is normally not needed. Furthermore, in this kind of camera, increasing the size of the buffer memory 12 results in the circuits of the camera becoming large in scale, and is a main cause in the cost increase of the camera.

SUMMARY OF THE INVENTION

Therefore, it is an object of the present invention to provide a video still camera with circuits which are small in scale.

It is a further object of the present invention to provide a video still camera which is relatively inexpensive.

Another object of the present invention is to provide a still camera with which continued photography is possible at a useful speed while using a small capacity buffer memory.

It is yet a further object of the present invention to provide a video still camera which provides high resolution when performing photography of images with many image elements, while using a small capacity buffer memory.

It is still a further object of the present invention to provide a video still camera which records an approximately constant quantity of data on a memory card for each frame of image data.

The above objects are achieved by providing a still camera which includes an imaging unit which photoelectrically converts light from a photographic field to analog signals, and which converts the analog signals to digital image data. A high speed reversible encoder receives the digital image data from the imaging unit and reversibly compresses the digital image data. A buffer memory temporarily stores the compressed image data from the high speed reversible encoder, after which the compressed image data is sent to a reversible code regenerator where the compressed image data is restored to its original state. An irreversible encoder then receives the restored image data and irreversibly compresses the restored image data. The irreversibly compressed image data is then stored in memory on a memory card.

In the still camera described above, a control unit controls all the camera circuits, and in addition, the control unit reads data out of the buffer memory and sends the data read from the buffer memory to the reversible code regenerator at a speed dependent on the processing speed of the irreversible encoder.

A code character memory is also provided which stores a code character representing the quantity of data which has been encoded by the high speed reversible encoder. Under control of the control unit, a parameter setting unit sets parameters for data compression by the irreversible encoder based upon the code characters stored in the code character memory.

BRIEF DESCRIPTION OF THE DRAWINGS

These and other objects and advantages of the invention will become apparent and more readily appreciated from the following description of the present preferred embodiments, taken in conjunction with the accompanying drawings, of which.

DETAILED DESCRIPTION OF THE PREFERRED EMBODIMENTS

Figure 1:
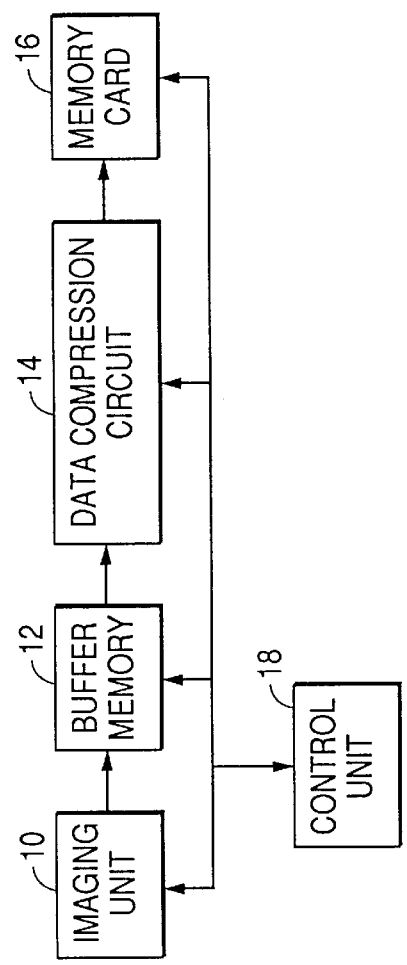
FIG. 1 is a block diagram of a prior art still camera imaging system.
Figure 2:
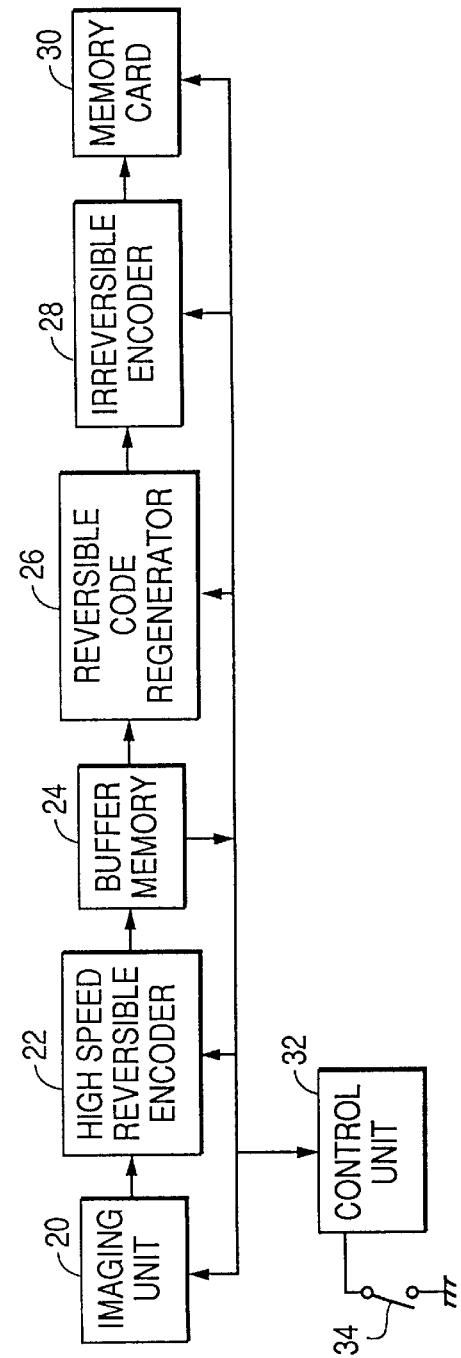
FIG. 2 is a block diagram of a still camera imaging system in accordance with a first embodiment of the present invention.

FIG. 2 is a block diagram illustrating a system for processing image data in a still camera in accordance with a first embodiment of the present invention. The image processing system includes an imaging unit 20 which outputs digital image data representing a photographic subject image. In a manner similar to the prior art, the imaging unit 20 photoelectrically converts light from a photographic field by means of a CCD, or similar device, and after white balance correction, amplification, γ correction, and like processing, performs A/D conversion and outputs digital image data.

A high speed reversible encoder 22 performs reversible data compression on the image data from the imaging unit 20. Paired with the high speed reversible encoder 22 is reversible code regenerator 26 which restores the image data compressed by reversible encoder 22. The high speed reversible encoder 22 and the reversible code regenerator 26 are paired such that the reversible encoder 22 performs high speed data compression on the digital image data output from the imaging unit 20, and outputs data in an undistorted state with respect to the original data such that it can be restored by the reversible code regenerator 26. The data compression/restoration method used may be any of a number of well known data compression methods in which the values of a DPCM (difference PCM) coder are Huffmann coded, or run length coding, in a manner similar to G3 facsimile, is Huffmann coded, etc. The degree of data compression efficiency of the high speed reversible encoder 22 is about ½ to ¼.

As a general principle, the data compression means in the high speed reversible encoder 22 and the data restoration means in the reversible code regenerator 26 are the same. Furthermore, for high speed processing, it is preferable that coding by the high speed reversible encoder 22 occurs at a higher speed than the speed of data transmission from the imaging unit 20. Moreover, from a circuit design standpoint, in order to make the control circuitry of the whole camera smaller, it is desirable to select circuits for the reversible encoder 22 and the reversible code regenerator 26 which are as small as possible. Therefore, the circuits which make up the reversible encoder 22 and reversible code regenerator 26 are generally on a small scale.

A buffer memory 24 is interposed between the high speed reversible encoder 22 and the reversible code regenerator 26 and temporarily stores the compressed image data output from the high speed reversible encoder 22. The capacity of the buffer memory 24 may be selected by taking into account the number of photographs taken in rapid succession or, as described below, the processing power of irreversible encoder 28. However, since compressed digital image data is stored in buffer memory 24, it is not necessary to provide for a large capacity memory. The buffer memory 24 in the present embodiment is a FIFO (first in, first out) type of memory, from which stored data is read out in succession. Furthermore, at a point at which vacant capacity within the buffer memory 24 becomes less than a predetermined amount, the buffer memory 24 outputs a wait signal as an instruction to stop writing data to the buffer 24.

An irreversible encoder 28 receives the restored image data from the reversible code regenerator 26 and irreversibly compresses the digital image data restored by the reversible code regenerator 26. The irreversible encoder 28 performs compression of the restored image data in a manner similar to the prior art, using an irreversible method, at high efficiency (i.e., at a high compression rate) with no distortion in the restored data with respect to the original data. Examples of high efficiency irreversible encoders suitable for use in the present invention are the JPEG (Joint Photographic Experts Group) system, and the conversion coding+ vector quantization system, or like systems. Compression efficiencies of about 1/10 to 1/30 can be expected using these types of systems. After irreversible data compression has been carried out by the irreversible encoder 28, the irreversibly compressed image data is stored in a recording medium on a memory card 30.

A control unit 32 performs control of all the camera circuits. A release switch 34 is connected to the control unit 32 and is set ON upon depression of a release button (not shown). When the release switch is ON, an instruction to commence a photographic operation is sent to the control unit 32. Furthermore, when the release switch 34 is continuously ON, photography is performed in rapid succession. The control unit 32, in proportion to the processing speed of the high efficiency irreversible encoder 28, causes image data to be read from the buffer memory 24 and sends the image data to the reversible code regenerator 26, as will be described in detail below.

Figure 3:
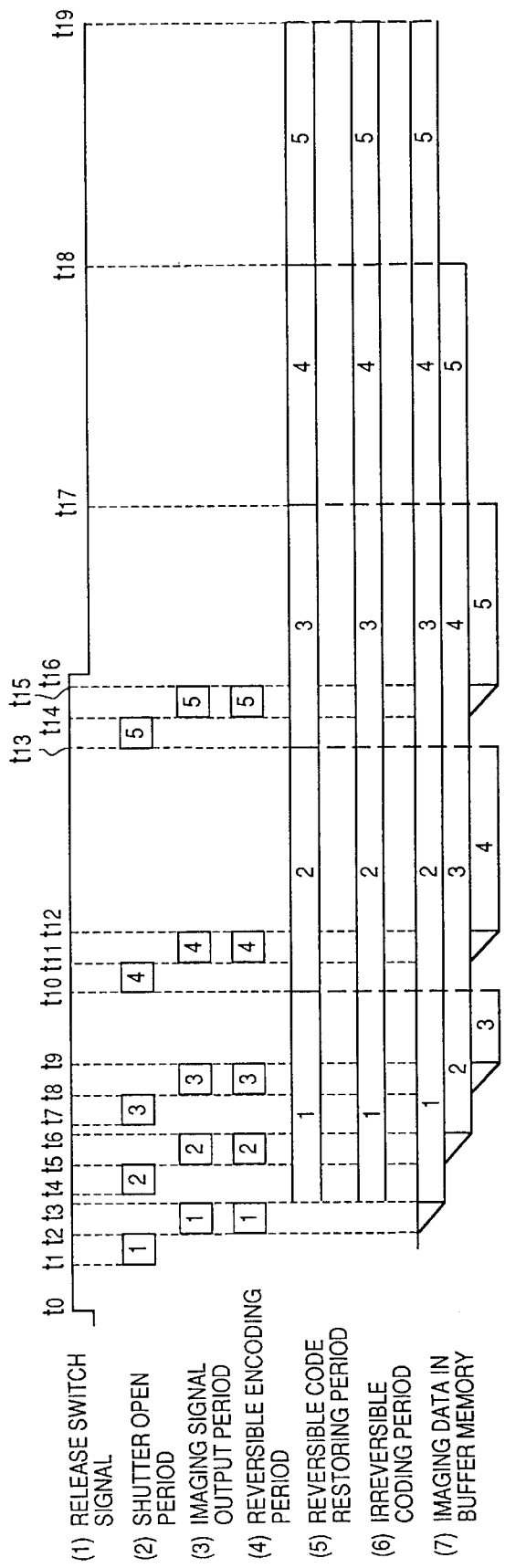
FIG. 3 is a timing chart showing an example of the operation of the still camera in accordance with the first embodiment of the present invention.

Referring now to FIG. 3, FIG. 3 is a timing diagram showing an example of the operation of the still camera in accordance with the first embodiment of the present invention. The signals whose timing periods are shown in FIG. 3 are numbered, from the top down, (1) through (7), and represent: (1) a signal output from the release switch 34; (2) the periods of opening of a shutter built into the imaging unit 20; (3) the periods of data output from the imaging unit 20; (4) the reversible encoding periods for the high speed reversible encoder 22; (5) the restoration periods of the reversible code regenerator 26; (6) the irreversible coding periods of the high efficiency irreversible encoder 28; and (7) the storing of image data in the buffer memory 24. The numbers shown within each period are the frame numbers of the images.

In the example shown in FIG. 3, a photographer, by depressing the release button continuously, sets the release switch 34 continuously ON during time period $t_0$–$t_{16}$. When the release switch 34 is set ON at time $t_0$, the necessary parameters for photography in the imaging unit 20 are set, and various check operations and other photographic preparative operations are performed. Next, based on instructions from the control unit 32, the shutter built into the imaging unit 20 is opened between times $t_1$ and $t_2$, and the image of one frame is input into the CCD of imaging unit 20. The imaging unit 20 photoelectrically converts the image by means of the CCD, and after white balance correction, amplification, γ correction, and the like processing, performs A/D conversion of the image data and outputs digital image data between times $t_2$ and $t_3$. The high speed reversible encoder 22 commences high speed reversible coding immediately when digital image data are output from the imaging unit 20 at time $t_2$, and the coding processing is performed practically in real time. Accordingly, when the output of image data from the imaging unit 20 ends at time $t_3$, the coding processing ends practically simultaneously. Furthermore, in this example, compressed image data is stored in the buffer memory 24 beginning at time $t_2$ and at all times after $t_2$.

According to this example, there is a surplus of buffer memory 24 at the point in time when one frame of compressed image data has been stored therein. Therefore, when the coding of the first frame of image data in the high speed reversible encoder 22 has ended, the control unit 20 immediately opens the shutter between times $t_4$ and $t_5$, thereby imaging a second frame. Thereafter, in a manner similar to the above-described procedure, the processing of the image data of the second frame by the high speed reversible encoder 22, and storage of the data in the buffer memory 24, are performed between times $t_5$ and $t_6$.

At time $t_3$, when a whole frame of image data has been stored in the buffer memory 24, the control unit 32 causes the data in the buffer memory 24 to be read out and sent to the reversible code regenerator 26. At this time, the control unit 32, taking into account the processing speed of the later stage high efficiency irreversible encoder 28, causes image data to be transmitted to the reversible code regenerator 26 at a transmission speed synchronized with the processing speed of the irreversible encoder 28. Therefore, the image data is transmitted to the irreversible encoder 28 at a speed which is equal to or less than the processing speed of the irreversible encoder 28. The reversible code regenerator 26 is capable of performing code processing practically in real time. However, since, as described above, the transmission speed of the reversible code regenerator 26 is synchronized with the processing speed of the irreversible encoder 28, a longer time is necessary for processing (i.e., time $t_3$–$t_{10}$) than the encoding processing time in the high speed reversible encoder 22. Thus, the image data is restored by the reversible code regenerator 26 and compressed by the high efficiency irreversible encoder 28 between times $t_3$ and $t_{10}$, after which the image data is recorded on the memory card 30.

In the example illustrated in FIG. 3, there is still a surplus in the buffer memory 24 at a point in time when the second frame of compressed image data is stored in the buffer memory 24. Therefore, the control unit 20 again opens the shutter between times $t_7$ and $t_8$, immediately after the coding of the high speed reversible encoder 22 ends, thereby imaging a third frame. Thereafter, the image data for the third frame are compressed by the high speed reversible encoder 22, and the operation of data storage into the buffer memory 24 is performed between times $t_8$ and $t_9$.

In this example, at the point in time at which the compressed image data of the third frame have been stored, a wait signal is output from the buffer memory 24 indicating that the vacant capacity in the buffer memory is below a predetermined amount. Accordingly, the control unit 32 prohibits the opening of the shutter between times $t_9$ and $t_{10}$ until the image data corresponding to the first frame have been completely read out from the buffer memory 24.

When the image data of the first frame have been completely read out from the buffer memory 24, restored by the reversible code generator 26, compressed by the high efficiency irreversible encoder 28, and recorded on the memory card 30 at time $t_{10}$, the wait signal output from the buffer memory 24 ceases. The control unit 32 detects the end of the wait signal and immediately reopens the shutter between times $t_{10}$ and $t_{11}$, thereby imaging a fourth frame. Thereafter, in a manner similar to the procedure described above, the image data of a fourth frame is compressed between times $t_{11}$ and $t_{12}$, and is stored in the buffer memory. When the image data of the fourth frame is stored in the buffer memory 24, a wait signal is again output from the buffer memory 24 because, according to this example, there is no surplus storage in the buffer memory 24 at this time.

The image data of the second frame is then read out from the buffer memory 24, the restoring action by the reversible regenerator 26 and the data compression action by the high performance irreversible encoder 28 are performed, and the data is recorded on the memory card 30 between times $t_{10}$ and $t_{13}$. Because there is no surplus storage in the buffer memory 24 until the image data of the second frame has been completely read out, the shutter opening action is still prohibited by the wait signal from the buffer memory 24.

However, when the image data of the second frame has been completely read out, the action of opening the shutter is again performed between times $t_{13}$ and $t_{14}$. Digital image data from imaging unit 20, corresponding to a fifth frame, is output and compressed between the times $t_{14}$ and $t_{15}$. The compressed image data of the fifth frame is stored in the buffer memory beginning at time $t_{14}$. At time $t_{16}$, the photographer, by no longer depressing the release button, sets the release switch 34 OFF.

After this, the image data is restored by reversible code regenerator 26 in conformity with the processing time of the high efficiency irreversible encoder 28, and data restoring, compression and recording actions are performed between times $t_{13}$ and $t_{17}$ for the third frame, between times $t_{17}$ and $t_{18}$ for the fourth frame, and between times $t_{18}$ and $t_{19}$ for the fifth frame, thus completing the recording of digital image data.

Therefore, according to the first embodiment of the present invention, by compressing image data with high speed reversible encoder 22 before storing in buffer memory 24, a larger number of frames of image data may be temporarily stored in the buffer memory 24 in comparison with a system which does not compress the data before storing in a buffer memory having the same capacity. Furthermore, even if the capacity of the buffer memory 24 is very small, practical use in successive photographic actions is still possible at a useful speed. For example, in the case in which a data compression rate of ½ can be attained by the high speed reversible encoder 22, data for twice the number of images can be stored in the buffer memory 24 in comparison with the case where no data compression is performed. The scale of the circuits of the camera is thereby prevented from becoming larger and an increase in cost is avoided. Moreover, compression of image data with the high speed reversible encoder 22 before storing in buffer memory 24 allows a greater number of image elements to be processed, and therefore provides high resolution when performing photography of images with many image elements, without requiring an increase in memory size.

Moreover, high speed processing is possible in the reversible encoding operation and because real-time processing is possible, the overall processing speed of the system is not reduced due to the data compression before storing in the buffer memory 24. In addition, because the size of the image data of one frame is compressed by data compression, even if the data transmission speed to the buffer memory 24 is slower than in the prior art, the same amount of data may be processed, and, therefore, it is not necessary to select a buffer memory capable of high speed writing/reading. Therefore, the number of different types of memories which may be selected as the buffer memory 24 is increased.

Figure 4:
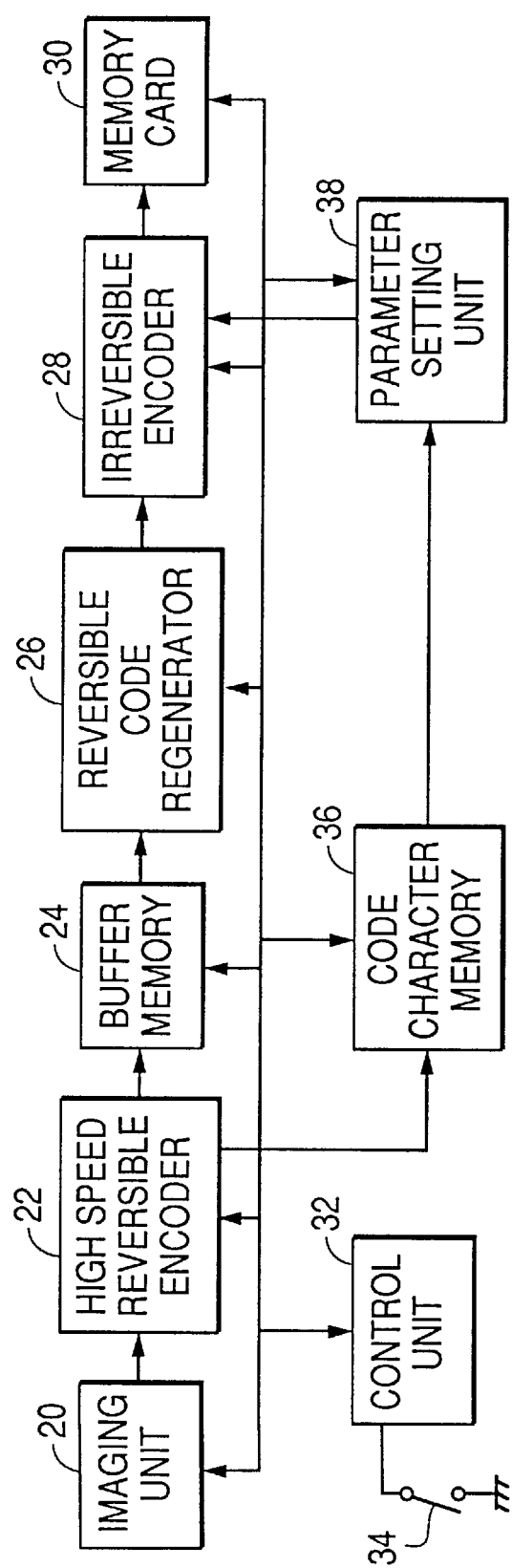
FIG. 4 is a block diagram of a still camera imaging system in accordance with a second embodiment of the present invention.

FIG. 4 is a block diagram showing a second embodiment of a still camera according to the present invention. Like elements in the figures for the first and second embodiments have like reference numerals. Furthermore, the explanation of the operation of elements which have been previously described above has been omitted.

Referring to FIG. 4, the second embodiment of the present invention includes a code character memory 36 in which is stored the code quantity of one frame of image data which has been compressed by means of the high speed reversible encoder 22. The second embodiment also includes a parameter setting unit 38 which is arranged to set the parameters of Huffmann coding, (e.g., the quantization coefficients, and the like) for the high efficiency irreversible encoder 28, based on the code quantity stored by code quantity memory 36. Because the code quantity due to high efficiency irreversible encoding (in other words, the quantity of data for one frame recorded on the memory card 30) can be estimated, and the code quantity due to reversible encoding is known from the code character memory 36, the parameter setting unit 38 controls the various parameters such that the data quantity of one frame recorded on the memory card 30 becomes approximately constant. For example, in the case in which the high speed reversible encoding is performed using the DPCM method, because the quantity of compressed data increases if there is a finer image, the parameters are set so that the finer image can be efficaciously compressed.

Figure 5:
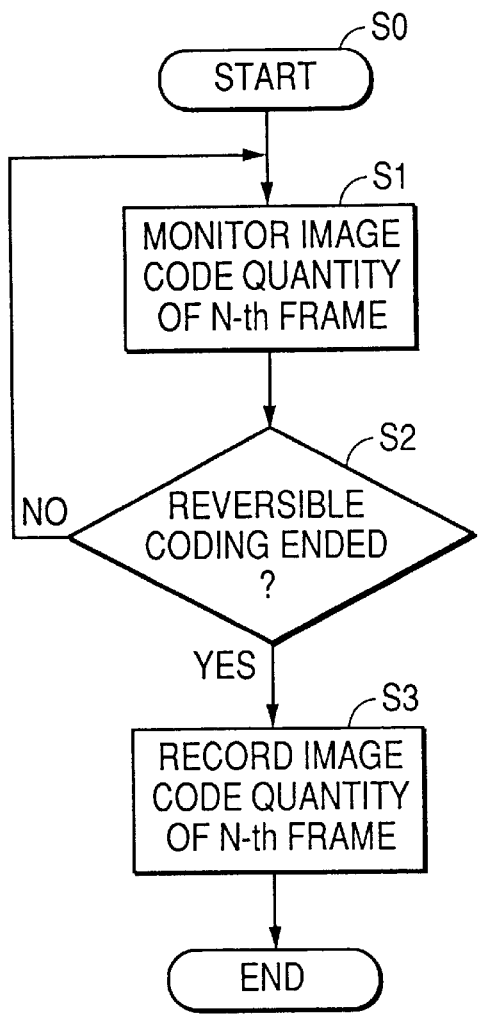
FIG. 5 is a flow chart illustrating a procedure for storing a coding character in accordance with the second embodiment of the present invention.

FIG. 5 is a flow chart showing an example of a procedure by which the code character memory 36 is used for storage of the code quantity. The program shown in the flow chart of FIG. 5 starts at S0 at the moment when the data compression action in the high speed reversible encoder 22 begins (times $t_2$, $t_5$, etc. in FIG. 3). First, in step S1, the control unit 32 monitors the code quantity of a frame which is being data-compressed by the high speed reversible encoder 22. In step S2, it is determined whether or not reversible encoding has ended. If the determination in step S2 is affirmative, the program proceeds to step S3, and if not, it returns to step S1, and the monitoring action continues until the reversible encoding has ended. In step S3, after reversible encoding has ended, the code quantity monitored by the control unit 32 is stored in the code character memory 36. In FIG. 3, step S3 is executed directly after times $t_3$, $t_6$, etc. which signify the end of respective reversible encoding periods.

Figure 6:
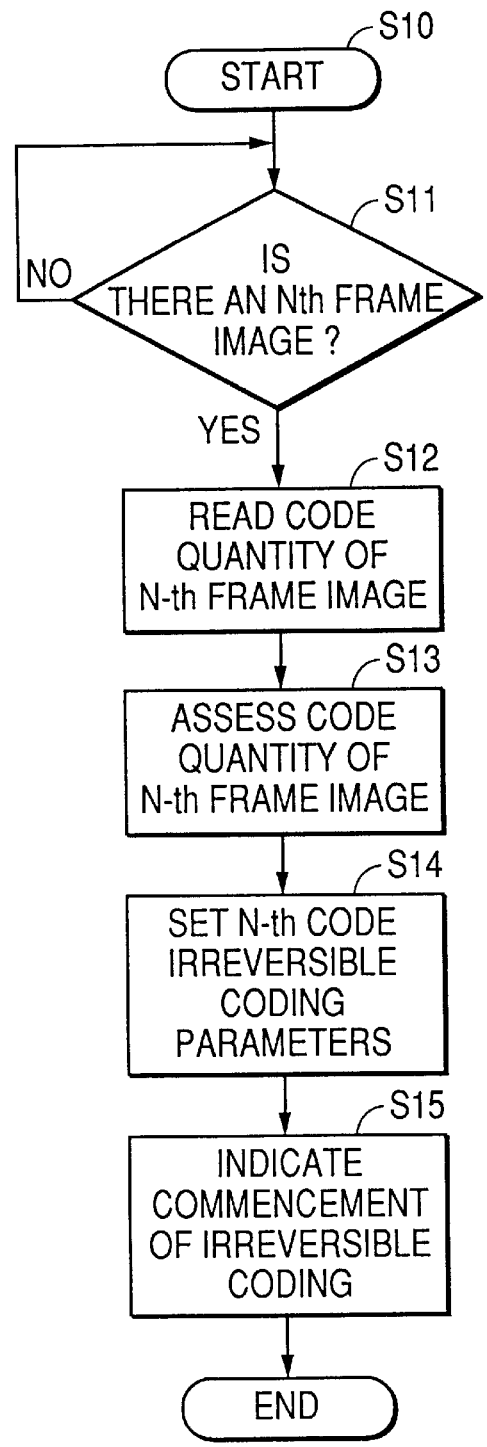
FIG. 6 is a flow chart illustrating a parameter setting procedure in accordance with the second embodiment of the present invention.

FIG. 6 is a flow chart showing an example of the operation of the parameter setting unit 38. The program shown in the flow chart of FIG. 6 starts in step S10 at the moment when image data representing a frame is read from the buffer memory 24 ($t_3$, $t_{10}$, etc. in FIG. 3). Next, in step S11, it is determined whether the image data corresponding to the frame indicated for the readout operation is stored in the buffer memory 24. If step S11 is affirmative, the program proceeds to step S12 and the code quantity of this frame is read out from the code character memory 36. In step S13, the code quantity read out is assessed, and the various parameters are set in step S14. Then, in step S15, the commencement of irreversible encoding for the image data of this frame is indicated.

Accordingly, by means of the second embodiment of the present invention, the data quantity recorded on card memory 30 can be made approximately constant, based on the capacity of the memory card 30 and the quantity of data in each frame, by setting the parameters of the irreversible encoding in accordance with a quantity of data encoded by the reversible encoder 22.

Moreover, the still camera of the present invention is not limited by the above-described embodiments, and various modifications are possible. For example, the specific methods of reversible coding and irreversible coding are not limited to those mentioned in the embodiment examples, and it is possible to apply any of the well-known coding methods.

Although preferred embodiments of the invention have been shown and described, it will be appreciated by those skilled in the art that changes may be made in these embodiments, without departing from the principle and the spirit of the invention, the scope of which is defined in the appended claims and their equivalents.

What is claimed is:

1. A still camera comprising:

imaging means for imaging a subject and outputting digital image data representing the subject;

reversible encoding means for performing reversible data compression on the digital image data output by the imaging means;

temporary memory means for temporarily storing digital image data compressed by the reversible encoding means;

reversible code regeneration means for restoring the digital image data compressed by the reversible encoding means;

irreversible encoding means for irreversibly compressing the digital image data restored by the reversible code regenerator; and memory means for storing the digital image data irreversibly compressed by the irreversible encoding means.

2. The still camera as claimed in claim 1, further comprising:

control means for reading out the digital image data temporarily stored in the temporary memory means and sending the image data to the reversible code regeneration means at a speed dependent on a processing speed of the irreversible encoding means.

3. The still camera as claimed in claim 1, further comprising:

a control unit to monitor a quantity of data corresponding to one frame of image data which has been compressed by the reversible encoding means;

code character memory means for storing a code character representing the quantity of data encoded by the reversible encoding means; and parameter setting means for setting parameters for controlling data compression by the irreversible encoding means, based on the code character stored in the code character memory means.

4. The still camera as claimed in claim 3, wherein the parameters for controlling data compression by the irreversible encoding means are set by the parameter setting means such that a data quantity for each frame of image data stored in the memory means becomes approximately uniform.

5. An image processing system, comprising:

an imaging unit photoelectrically converting light from a photographic field to analog signals, and converting the analog signals to digital image data;

a high speed reversible encoder receiving the digital image data from the imaging unit and reversibly compressing the digital image data;

a buffer memory receiving the compressed image data from the high speed reversible encoder and temporarily storing the compressed image data;

a reversible code regenerator receiving the compressed digital image data temporarily stored in the buffer memory and restoring the compressed image data to its original state;

an irreversible encoder receiving the restored image data and irreversibly compressing the restored image data; and a memory card receiving and storing the image data compressed by the irreversible encoder.

6. The image processing system as claimed in claim 5, further comprising:

a control unit reading data out of the buffer memory and sends the data read from the buffer memory to the reversible code regenerator at a speed dependent on a processing speed of the irreversible encoder.

7. The image processing system, as claimed in claim 5, further comprising:

a control unit to monitor a quantity of data corresponding to one frame of image data which has been compressed by the high speed reversible encoder;

a code character memory storing a code character representing a quantity of data encoded by the high speed reversible encoder; and a parameter setting unit setting parameters for data compression by the irreversible encoder, based on the code character stored in the code character memory.

8. The image processing system, as claimed in claim 7, wherein the parameters for controlling data compression by the irreversible encoder are set by the parameter setting unit such that a data quantity for each frame of image data stored in the memory card becomes approximately uniform.

9. A method for processing image data, comprising:

imaging a subject to produce digital image data representing the subject;

reversibly compressing the digital image data representing the subject;

temporarily storing the compressed digital image data;

restoring the temporarily stored compressed image data to its original state;

irreversibly compressing the restored image data; and storing the irreversibly compressed image data.

10. A method for processing image data as recited in claim 9, wherein the step of restoring the compressed image data comprises:

reading the temporarily stored compressed image data at a speed dependent on a speed at which the restored image data is irreversibly compressed.

11. A method for processing image data as recited in claim 9, further comprising the steps of:

generating a code character representing a quantity of data which has been reversibly compressed; and setting a parameter controlling the irreversible compressing of the restored image data based upon the generated code character.

12. A method for processing image data as recited in claim 11, wherein the step of generating a code character includes generating the code character based on a quantity of data corresponding to a frame of image data, and the step of setting a parameter sets the parameter such that a quantity of data corresponding to a frame of data stored becomes approximately uniform.

13. A still camera, comprising:

an imaging unit to image a subject and to output a frame of digital image data representing the subject;

a release switch to initiate operation of the imaging unit in response to setting the release switch ON;

a high speed reversible encoder to receive the digital image data output by the imaging unit and to reversibly compress the digital image data;

a buffer memory to receive the compressed image data from the high speed reversible encoder and to temporarily store the compressed image data;

a reversible code regenerator to receive the compressed digital image data temporarily stored in the buffer memory and to restore the compressed image data to its original state;

an irreversible encoder to receive the restored image data and to irreversibly compress the restored image data;

a memory card to receive and store the image data compressed by the irreversible encoder; and a control unit, operably coupled to the release switch, the high speed reversible encoder, the buffer memory, the reversible code regenerator, the irreversible encoder and the memory card, to sense the end of encoding of a first frame of digital image data by the high speed reversible encoder and to cause the imaging unit to image a next frame of image data in response to the end of encoding of the first frame of image data, to cause the data stored in the buffer memory to be sent to the reversible code regenerator in response to sensing one frame of data stored in the buffer memory, and to cause the image data to be sent to the reversible code regenerator at a transmission speed equal to or less than the processing speed of the irreversible encoder, wherein the buffer memory outputs a wait signal to the control unit when the remaining capacity of the buffer memory is below a predetermined amount, and the control unit inhibits the imaging unit from operating while the wait signal is output.

14. A still camera as recited in claim 1, wherein the imaging means continuously outputs a plurality of frames of digital image data which are compressed by the reversible encoding means, and the temporary memory means temporarily stores the plurality of frames of compressed digital image data.

15. An image processing system as recited in claim 5, wherein the imaging unit continuously outputs a plurality of frames of digital image data which are compressed by the high speed reversible encoder and the buffer memory temporarily stores the plurality of frames of compressed digital image data.

* * * * *